Nov. 6, 1956  A. W. ECKSTROM  2,769,489
MULTIPLE EFFECT EVAPORATOR
Filed Sept. 14, 1954
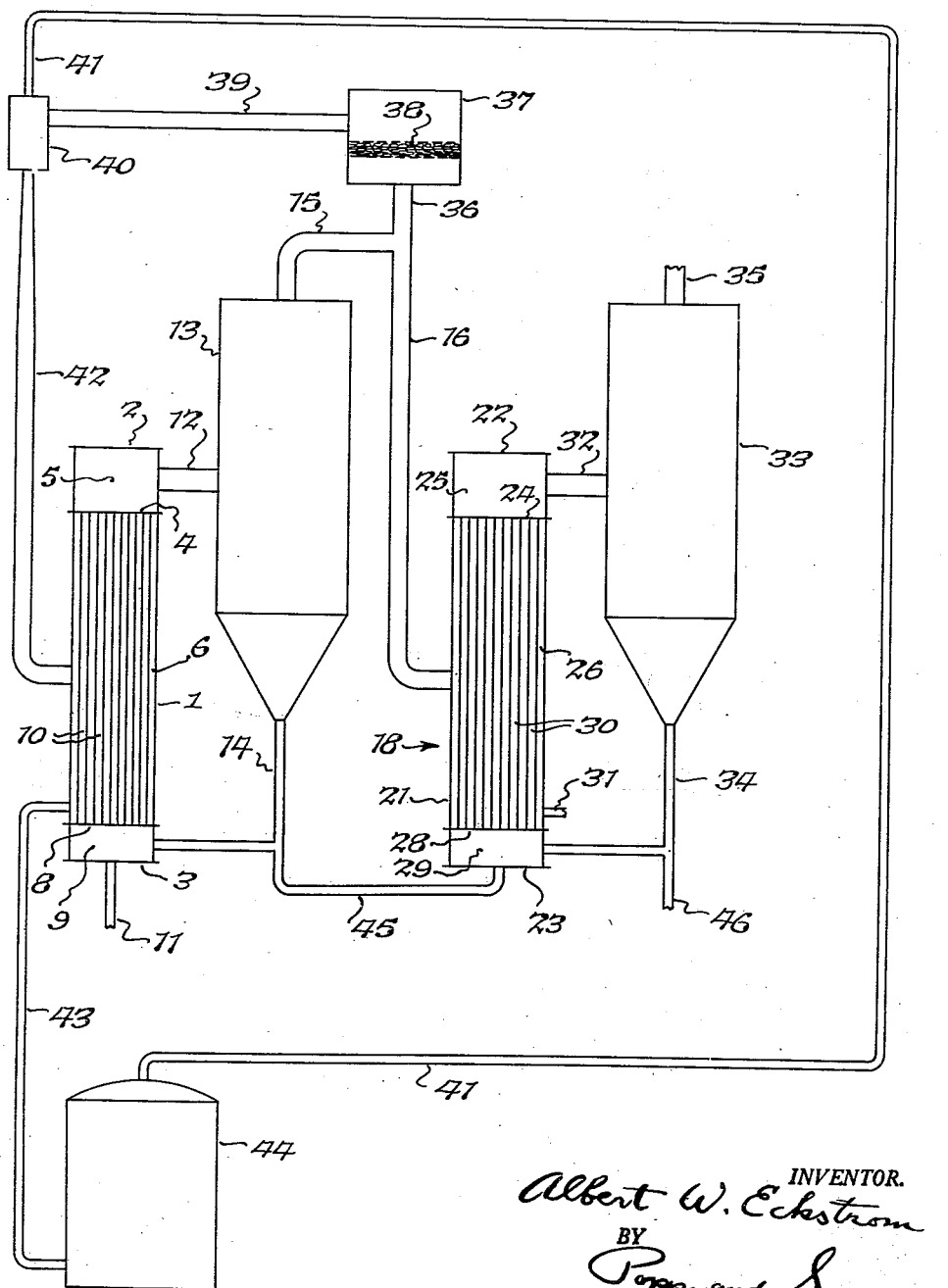
INVENTOR.
Albert W. Eckstrom
BY
Popp and Sommer
Attorneys.

United States Patent Office 2,769,489
Patented Nov. 6, 1956

2,769,489
MULTIPLE EFFECT EVAPORATOR

Albert W. Eckstrom, Buffalo, N. Y., assignor to Blaw-Knox Company, Pittsburgh, Pa., a corporation of Delaware Application September 14, 1954, Serial No. 456,030

3 Claims. (Cl. 159—24)

This invention relates to a multiple effect evaporator and is more particularly shown as embodied in a multiple effect vacuum evaporator used for concentrating such products as milk and in which a small amount of entrained liquid is carried off in the form of very small mist-like droplets which cannot be separated from the vapor by conventional centrifugal or changing direction of flow liquid-vapor separators.

One of the principal objects of the present invention is to reduce the amount of steam required to run the multiple effect evaporator.

Another object is to reduce the amount of heat required to run the evaporator.

Another object is to reduce the amount of make-up water required and thereby reduce the cost of treating such make-up water to condition it for use as boiler water.

Another object is to return to the steam boiler all of the steam condensate and also a large proportion but not all of the water vaporized in the first effect of the evaporator.

Another object is to obtain pure water vapor from a part of the vapors from the liquid being processed so that the condensate of this water vapor can be used as boiler feed water without fouling the steam system of the evaporator with the product being concentrated.

Other objects and advantages of the invention will be apparent from the following description and drawing which is a schematic representation of a multiple effect vacuum milk evaporator embodying the present invention and supplied with steam from a steam boiler.

In the multiple effect milk evaporator illustrated, the numeral 1 represents a vertical cylindrical shell having end heads 2 and 3 at its upper and lower ends, respectively. An upper tube sheet 4 extends across the interior of the shell 1 near its upper end to provide a vapor space 5 above this tube sheet and a steam space or chest 6 below this tube sheet. A lower tube sheet 8 extends across the interior of the shell 1 near its lower end to form the lower limit of the vapor space 5 and to provide a liquid chamber or space 9 below this tube sheet. Open ended vertical tubes 10, which constitute the heat transfer surface, extend through and are secured to these tube sheets 4 and 8, a level of the liquid to be concentrated being maintained in these tubes 10 and steam surrounding these tubes vaporizing the liquid therein so as to violently project liquid and vapor upwardly to geyser from the upper ends of the tubes into the vapor space 5.

The liquid to be concentrated can be admitted to the liquid chamber 9 through an inlet line 11.

The vapor with liquid entrained therein passes through the vapor outlet 12 into a vapor-liquid separator 13. The liquid separated from the vapor in this vapor-liquid separator 13 flows through a return leg 14 back to the liquid chamber or space 9 where it rejoins the liquid being concentrated in the first effect. The vapor from the vapor-liquid separator leaves through an outlet 15 having a horizontal part connecting with a vertical tube 16 which extends downwardly to supply the vapor to the second effect indicated generally at 18.

In this second effect, the numeral 21 represents a vertical cylindrical shell having end heads 22 and 23 at its upper and lower ends, respectively. An upper tube sheet 24 extends across the interior of the shell 21 near its upper end to provide a vapor space 25 above this tube sheet and a steam space or chest 26 below this tube sheet. A lower tube sheet 28 extends across the interior of the shell 21 near its lower end to form the lower limit of the vapor space 25 and to provide a liquid chamber or space 29 below this tube sheet. Open ended vertical tubes 30 extend through and are secured to these tube sheets 24 and 28, a level of the liquid to be concentrated being maintained in these tubes 30 and the vapor surrounding these tubes and supplied from the vertical vapor tube 16 vaporizing the liquid therein so as to violently project liquid and vapor upwardly to geyser from the upper ends of the tubes into the vapor space 25.

The condensate from the steam chest 26 passes through a condensate outlet 31 to waste.

The vapor with liquid entrained therein passes through the vapor outlet 32 into a vapor-liquid separator 33. The liquid separated from the vapor in this vapor-liquid separator 33 flows through a return leg 34 back to the liquid chamber or space 29 where it rejoins the liquid being concentrated in the second effect. The vapor from the vapor-liquid separator 33 leaves through an outlet 35 connecting with a source of vacuum so that the multiple effect evaporator operates under vacuum.

The vertical vapor line or tube 16 has an upward extension 36 leading to the bottom of a separation chamber 37 having a large horizontal area. Across the central part of this chamber and forming a horizontal partition or wall completely thereacross is a pad or batt 38 of a knitted fine wire mesh formed of uniformly interlocked wire loops to provide a structure having flexibility, resiliency, extensive surface area, light weight and structural strength and with the wire closely woven to effectively intercept or catch the mist-like droplets of liquid entrained with the vapor passing therethrough provided the face velocity of the vapor is held to a low enough value to permit such complete separation of mist-like droplets from the vapor.

The vapor, after passing upwardly through the batt or pad 38 having the remaining traces of mist-like entrained liquid removed therefrom, passes through a vapor line 39 to the vapor inlet of a steam pressure booster or steam jet compresser 40 where the pressure of the vapors is raised by stem supplied through its steam pressure inlet from a steam line 41 to the value required in the steam chest 6. The steam from 41 and the vapor from 39 so compressed by the steam from 41 passes through the compressed vapor line 42 to the steam chest 6 where it condenses. It is a feature of the present invention that the condensate from the condensate line 43 is returned to the boiler 44 as boiler feed water, this boiler generating the steam supplied through the steam line 41.

The evaporator is shown as being of the forward flow type with the concentrated liquid from the first effect passing to the second effect through a liquid line 45 leading from the return leg 14 to the liquid space 29 of the second effect. The concentrated liquid can be withdrawn from the evaporator at 46.

The following is an example of the practice of the invention as illustrated in the concentration of skim milk. The skim milk having 8.6% solids and preheated to 165° F. is admitted at a rate of 15,300 pounds per hour through the inlet 11 to the liquid space 9 of the first effect.

4,215 pounds per hour of steam at 125 pounds gage pressure from steam line 41 and boiler 44 compresses 3660 pounds per hour of vapor from 39 to maintain a temperature of 191° F. in the steam chest 6, an 11 inch vacuum being maintained in this steam chest. This generates 7725 pounds per hour of water vapor, which passes with the liquid entrained therein, because of the geysering of the liquid from the upper ends of the tubes 10 into the vapor liquid separator 13 in which a vacuum of 20.3 inches of mercury and a temperature of 160° F. is maintained. The entrained liquid entering the liquid-vapor separator 13 and separated therein passes into the return leg 14 at 160° F. This liquid has been concentrated to 17.3% solids. A part of this liquid so concentrated in the first effect and entering the return leg 14, namely 7575 pounds per hour, passes through the line 45 to the bottom liquid chamber 29 of the second effect 18.

Of the 7725 pounds per hour of water vapor leaving the vapor separator 13, 4065 pounds per hour travel downwardly through the vertical vapor line 16 into the steam chest 26 of the second effect 18, and 3660 pounds per hour travel upwardly through this vertical vapor line 16 into the separation chamber 37. The vapor entering this chamber carries a small amount of entrained milk in the form of mist-like droplets and the purpose of the pad 38 is to remove these mist-like droplets before the vapor is compressed for use in the steam chest 6 and thereafter returned as condensate to the boiler 44. An important feature of the invention is that the vapor, carrying such mist-like droplets, passes through the pad 38 at a sufficiently low velocity so that these mist-like droplets are caught by the multiplicity of wire loops which constitute this pad. To this end, the face velocity of the vapor passing through the pad 38 is in the order of 20 to 30 feet per second and at this low face velocity, the mist-like droplets are caught by the knitted wire pad 38, and the vapor leaving the upper surface of this pad is substantially pure water vapor which is compressed in the booster or steam jet compressor 40 as previously described. It will be noted that somewhat less than half of the vapor generated in the first effect is compressed to enter the steam chest of this first effect.

The 4065 pounds per hour of vapor entering the steam chest 26 of the second effect vaporizes the milk contained in the tubes 30, a 27 inch of mercury vacuum being maintained in the vapor space 25 of this effect as well as in the vapor separator 33. At this pressure, 4275 pounds per hour of vapor, including feed flash, leaves the vapor outlet 35 at 115° F. This vapor can be condensed in any conventional condenser (not shown). Product can be withdrawn from the return leg 34 at a concentration of 40% solids through the material outlet or discharge 46, the milk at such concentration being 3300 pounds per hour.

From the above example, it will be seen that of the total of 7725 pounds per hour of vapor leaving the separator 13, only 3660 pounds per hour is recycled through the knitted metal mesh pad 38 for recompression in the steam jet compresser 40, the balance of 4065 pounds per hour passing through 16 into the steam chest 26 of the second effect. This is an important feature of the invention particularly in that the filtration and recompression of all of the vapor leaving the first effect would not only be unnecessary but would create additional problems. Thus, it will be seen that all of the steam from the boiler is condensed and then returned through the line 43. If in addition all of the vapor from the material being processed were condensed and returned to the boiler, the condensate would be in great excess. Further to handle all of the vapor output from the first effect, the pad 38 of knitted wire mesh would have to be very much larger especially to provide the low face velocity necessary to the effective separation of the very small droplets from the vapor.

In the practice of the present invention, the greater part of the vapor from the first effect goes directly through 16 to the steam chest 26 of the second effect. The vapor to this second effect steam chest need not be so pure since the second effect operates at a lower temperature and lower pressure.

It will be seen that with a multiple effect evaporator as above described, the amount of steam required is greatly reduced since almost half of the steam supplied is from the vapor generated in the first effect. It will also be seen that acordingly the amount of heat required to run the multiple effect evaporator is greatly reduced as well as the amount of and cost of treating the make-up water required. The use of the vapor leaving the first effect as the medium to heat that effect is permitted by the purification of the condensate from the first effect through the practically complete removal of the mist-like droplets of entrained liquid carried away with the vapor from this effect by the pad 38, it being essential that the velocity of the vapor passing through this pad be of sufficiently low velocity that these mist-like droplets are caught by the wire loops which constitute this pad. It will also be seen that all of the steam condensation is returned to the boiler as well as a very large proportion of the water vaporized in the first effect.

I claim:

1. In a multiple effect evaporator with a first and a second effect each having a steam chest with heat transfer surfaces also forming a wall of the liquid space for the liquid to be concentrated, a condensate outlet line from each said steam chest, means for separating entrained liquid from the vapor generated from said liquid by the heat from said first effect steam chest, and a vapor outlet from said separating means, the combination therewith of means for supplying high pressure steam to said first effect steam chest, comprising a boiler supplied with condensate from said condensate outlet line of said first effect, a pair of branches in said vapor outlet of said first effect, means connecting one of said branches to discharge vapor into the steam chest of said second effect, an enlarged separating chamber into which the other of said branches discharges vapor, a pad of closely intertwined thin elongated flexible pieces across said separating chamber and arranged to catch the mist-like droplets carried into said separating chamber by said vapor, said separating chamber having an outlet on the side of said pad remote from said other of said branches, a steam jet compresser having a vapor inlet, a steam pressure inlet and an outlet for the vapor compressed by steam from said steam pressure inlet, a conduit connecting said outlet for said separating chamber with said vapor inlet to said compresser, a steam line connecting said boiler with said steam pressure inlet of said compresser, and a conduit connecting said compressed vapor outlet of said steam jet compresser with said steam chest of said first effect, and means arranged to conduct said liquid from said first effect to said liquid space of said second effect.

2. The combination set forth in claim 1 wherein the face area of said pad is such as to provide a vapor face velocity of from about 20 to about 30 feet per second.

3. The combination set forth in claim 1 wherein said pad is horizontally disposed.

References Cited in the file of this patent

UNITED STATES PATENTS

| 478,458 | Petterson et al. | July 5, 1892 |
| 1,015,704 | Newhall | Jan. 23, 1912 |
| 1,258,562 | Harris | Mar. 5, 1918 |
| 1,387,476 | De Baufre | Aug. 16, 1921 |
| 1,440,026 | Nilsson | Dec. 26, 1922 |
| 1,878,651 | Teetsow | Nov. 20, 1932 |
| 2,217,547 | Hall | Nov. 14, 1938 |